UNITED STATES PATENT OFFICE.

JOHN W. HYATT AND ISAIAH S. HYATT, OF NEWARK, N. J., ASSIGNORS TO THE CELLULOID MANUFACTURING COMPANY, OF NEW YORK, N. Y.

IMPROVEMENT IN GRINDING-WHEELS.

Specification forming part of Letters Patent No. 165,234, dated July 6, 1875; application filed December 1, 1874.

*To all whom it may concern:*

Be it known that we, JOHN W. HYATT and ISAIAH SMITH HYATT, of Newark, in the county of Essex and State of New Jersey, have invented an Improvement in Grinding-Wheels, of which the following is a specification:

Wheels have been made of particles of emery, consolidated and molded into shape by the addition of glue, india-rubber, and other adhesive materials. In most instances these wheels are liable to glaze and lose their sharp cutting-surface, in consequence of the adhesive material used to cement the particles together becoming soft and spreading on the surface, either by the friction and warmth or by the action of the grease and similar material frequently present in grinding and polishing operations. Our invention is made for avoiding these difficulties. We make use of celluloid, nitro-cellulose, pyroxyline or collodion, or their compounds, as the adhesive material to cement the particles of emery, corundum, or other grinding and polishing material together. The materials are to be properly prepared by grinding, sifting, and mixing, and the celluloid or equivalent adhesive material is intimately mixed in the presence of sufficient heat to accomplish the object of spreading the adhesive material uniformly over the surfaces of the particles, and then the article is molded and consolidated by suitable pressure in heated molds.

We have discovered that grinding-wheels made as aforesaid are not liable to glaze, or to break or crack. They are very solid and durable, and the celluloid appears to be abraded or cut away by the heated particles of steel, so as to leave cutting-edges of the emery always free; thus the wheel does not become dull or glazed with foreign material, and this wheel is not injured by water or grease.

We claim as our invention—

The grinding-wheel made of emery or similar particles united together by celluloid or pyroxyline, or their compounds, as set forth.

Signed by us this 25th day of November, A. D. 1874.

JOHN W. HYATT.
I. SMITH HYATT.

Witnesses:
GEO. D. WALKER,
GEO. T. PINCKNEY.